United States Patent Office 3,187,046
Patented June 1, 1965

3,187,046
REDUCTION OF NITROOLEFINS TO AMINES
Harris L. Curtis, Needham, Mass., assignor to Polaroid Corporation, Cambridge, Mass., a corporation of Delaware
No Drawing. Filed Dec. 29, 1960, Ser. No. 79,158
8 Claims. (Cl. 260—570.8)

This application relates to a novel chemical synthesis, and more particularly to an improved process for the reduction of nitroolefins to the corresponding amines.

In United States Patents Nos. 2,636,901 and 2,647,930, there are disclosed processes for reducing nitroolefins to form a mixture of the corresponding ketones and the corresponding amines. By a careful control of the operating conditions, the practitioner is able to produce either a predominant amount of amine or a predominant amount of ketone, depending upon the particular product sought. In all instances, however, the reaction product is a mixture of both the ketone and the amine. This of course necessitates a separation of the reaction mixture in order to obtain the desired compound in substantially pure form. Moreover, where only one compound is sought, such as the amine, the formation of the ketone as well as the amine substantially reduces the overall yield. While this is not necessarily significant on the laboratory scale, it should be apparent that on the commercial scale, an increase in yield is extremely desirable, if not critical.

The present invention relates in essence to an improvement over the processes disclosed in the aforementioned patents wherein nitroolefins are reduced to form the corresponding amine, the reaction mixture being substantially free from undesired ketone.

It is therefore one object of this invention to provide a process for producing amines in increased yields.

Another object is to produce amines in increased yields not heretofore obtainable by subjecting nitroolefins to the action of molecular hydrogen in the presence of a hydrogenation catalyst and an organic acid.

Other objects of the invention will in part be obvious and will in part appear hereinafter.

The aforementioned United States Patent No. 2,636,901 discloses a process for preparing a mixture of amines and ketones by subjecting nitroolefins to the action of molecular hydrogen in the presence of a Raney nickel catalyst and an organic acid. The presence of an organic acid is necessary in order to eliminate or minimize the formation of undesirable condensation products which otherwise may be produced in large amounts. By varying the amount of water present and the strength of the organic acid employed, either a preponderance of amine or a preponderance of ketone is obtained. As taught in the patent, where a preponderance of amine is sought, weak organic acids such as acetic acid should be employed if a small amount of water is present in the reaction medium. If, on the other hand, the reaction medium is substantially anhydrous, stronger organic acids may be employed. The patent teaches that the reaction is complete when substantially all of the nitroolefin is reduced to a mixture of amine and ketone. Thus, when following the teachings of the patent, the reaction is considered as completed when it has slowed down to a point where, relatively speaking, very little hydrogen is taken up.

It has now been found, quite surprisingly, that if the reduction is allowed to continue further, substantially all of the ketone previously formed is converted to the corresponding amine. In other words, it has been discovered by the applicant that an appreciably increased yield of amines may be obtained by reducing nitroolefins in what may be regarded as a two-step reduction: (1) a first step following the teachings of the aforementioned patents wherein a nitroolefin is reduced to form a mixture of amine and ketone; and (2) a second step in which the mixture of ketone and amine is further subjected to molecular hydrogen until substantially all of the unwanted ketone is converted to the desired amine.

The present invention therefore comprises the step of reducing a nitroolefin with molecular hydrogen in the presence of a hydrogenation catalyst, and more particularly, a Raney nickel catalyst and an organic acid, e.g., an aliphatic carboxylic acid, until the reaction mixture contains substantially no ketone and contains essentially only the desired amine.

Nitroolefins which may be satisfactorily reduced by the present invention may be represented by the following general structural formula:

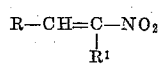

$$R-CH=C-NO_2$$
$$\phantom{R-CH=C-}|$$
$$\phantom{R-CH=C-}R^1$$

wherein R may be alkyl, preferably lower alkyl, or aryl and $R^1$ is lower alkyl, such as methyl, ethyl, isopropyl, etc. It will be understood that the corresponding nitroolefins in which the alkyl or aryl radical is substituted also may be employed in the present invention, since obviously various substituents may be present in such alkyl and aryl radicals without affecting the reaction mechanism.

In the preferred embodiments, R is phenyl, or a substituted phenyl radical, such as tolyl; a dialkoxyphenyl, such as 1,4-dimethoxyphenyl; or halo, lower alkyl or lower alkoxy derivatives of such radicals. As examples of nitroolefins within the above formula which can be reduced according to the present invention, mention may be made of 1-phenyl-2-nitro-1-butene, 1-(p-isopropylphenyl)-2-nitro-propene, 1-(m-tolyl)-2-nitro-propene, 2 - nitro-2 - hexene, 1-phenyl-2-nitro-1-propene, 4-phenyl-2-nitro-2 - pentene, 1-(p-methoxyphenyl)-2-nitro-propene and 1-(2',5'-dimethoxyphenyl)-2-nitro-1-propene.

As was indicated previously, if the reduction is permitted to continue for a period of time longer than that which is necessary to reduce the nitroolefin to a mixture of ketone and amine, the reaction product will be substantially free of undesired ketone, the ketone having been converted to the corresponding amine. This fact that the desired amine can be obtained from the ketone which is unwanted and is in effect regarded as an impurity is quite unexpected and is the essence of the present invention.

The initial stage of the reaction, wherein the nitroolefin is converted to a mixture of ketone and amine, is a highly exothermic reaction which may be carried out at pressures and temperature such as taught in the aforementioned patents. In other words, the initial stage may be carried out at temperatures of about 40 to about 100° C., and at pressures of the order of 500 to 2,000 pounds per square inch. Particularly good results have been obtained at pressures of about 800 to 1,200 pounds per square inch and temperatures from about 55 to 80° C.

It should be noted that, in the initial stage, the greater the temperature beyond 80° C., the greater is the tendency for polymerization or production of undesired by-products, and hence, the lower the overall yield.

The time of reaction in the initial stage will vary in accordance with the operating conditions and may, for example, be in the order of an hour or more. In any event, the initial stage is completed when the exotherm has substantially subsided and the temperature stabilizes.

The second stage, wherein the mixture of ketone and amine formed in the initial stage is further treated until substantially all of the ketone is converted into amine, requires appreciably less hydrogen for completion, say, for example, 5% of the total hydrogen, and may be carried out at the same temperature as the initial stage or at considerably higher temperatures. It should be noted that the roughly 5% additional hydrogen taken up in the second stage produces at least a 20% increase in yield of amine. If the second stage is carried out at the same temperature, the reaction time for converting substantially all of the ketone to amine is considerably longer than the reaction time of the first stage. In this respect, it should be noted that the reaction time for completion of the second stage is, at least in part, dependent upon the temperature, that is, at higher temperatures, the reaction is completed in less time. For example, at 80° C., the second stage may take as long as 16 hours for completion whereas at 90° C., good results have been obtained in 5 to 6 hours.

The second stage may be carried out at increased temperatures, say at 120° C., or higher, without being confronted with the danger of reducing the yield due to polymerization and formation of other by-products, as was true in the initial stage. Thus, in the preferred embodiment, the temperature is raised following completion of the initial stage, thereby reducing the overall reaction time.

In order to understand more clearly the nature and scope of the present invention, the reactions occurring in each of the two stages are described below in more particularity.

In the initial stage of the reduction, the nitroolefin is reduced to form a mixture of amine and ketone, according to the following general reaction:

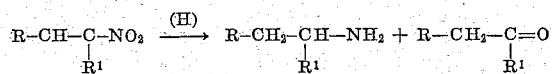

While the amine is prepared directly by the reduction of the nitroolefin, it is believed that the ketone is prepared by the following sequence of steps:

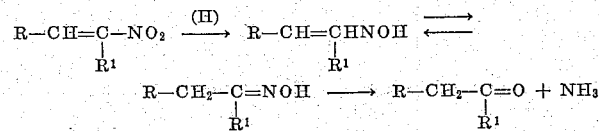

The ammonia split off, during the formation of the ketone, is immediately taken up by or reacts with the organic acid to form the ammonium salt thereof.

It is at this point that the prior art stops the reaction. However, it has now been discovered that, due to the presence of ammonia in the reaction mixture, if the reaction is permitted to continue, the ketone is slowly reduced to the corresponding amine, according to the following general reaction:

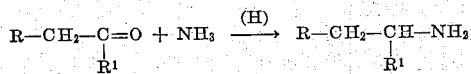

In carrying out the process of this invention, the strength or dissociation constant of the organic acid employed, is not particularly critical, as was the case in the processes described in the aforementioned patents. Likewise, the presence of water is not a critical factor to the end result. This is true since it is not critical whether the initial stage produces a preponderance of amine or a preponderance of ketone.

Since the strength or dissociation constant of the organic acid employed is not critical, as was the case in the processes described in the aforementioned patents, any of the organic acids such as were recited in the patents and having an ionization constant at 25° C., between about $1.4 \times 10^{-5}$ and $1.1 \times 10^{-3}$ may be employed. Examples of such acids are acetic, propionic, butyric, valeric, lactic, tartaric and formic acids.

The quantity of acid employed is not particularly critical and can vary. For maximum yield, however, it has been found that at least one mole of acid should be used for each mole of nitroolefin.

The term "organic acid" as applied to this invention does not include the halogen derivatives of the organic acids such as chloropropionic acid, bromopropionic acid, and the like, due to the harmful effect of the halogen on the catalyst.

While the use of a Raney nickel catalyst has been described for purposes of illustrating the invention, it is within the scope of the invention to employ other suitable catalysts of equivalent function. Thus, the invention should not be construed as limited to the use of a Raney nickel catalyst. As examples of other catalysts which may be employed, mention may be made of palladium on barium sulfate and "Girdler G-49A" nickel catalyst (a stabilized catalyst with a molecular film of oxygen).

Where found desirable or expedient to do so, suitable organic solvents may be used in the reaction medium along with the organic acid and the Raney nickel catalyst. Solvents which may be employed may be selected from a long list of organic solvents which are inert to the reactants and the products formed by the reduction. As examples of useful organic solvents, mention may be made of alcohols such as methanol, ethanol and propanol; ethers such as ethyl ether, propyl ether and ethyl hexyl ether; esters such as methyl acetate, ethyl formate and amyl acetate, and various acids and hydrocarbon solvents well known in the art.

The following example shows by way of illustration and not by way of limitation the process of this invention, the invention not being limited to the ingredients, proportions, time of treatment, and other operating conditions recited therein.

*Example 1*

A five gallon high-pressure autoclave was charged with the following materials:

| | | |
|---|---|---|
| 1-(2',5'-dimethoxyphenyl)-2-nitro-1-propene | kg | 3.5 |
| Methanol | l | 9.5 |
| Acetic acid | l | 1.2 |
| Raney nickel catalyst | g | 500.0 |

The autoclave was closed and flushed several times with nitrogen. It was then heated to 55 to 60° C., and hydrogen was introduced at a pressure of 1,200 pounds per square inch. A strong exotherm occurred and the temperature was controlled by cooling to remain at 65 to 75° C. In about 1 hour, the exotherm subsided and the autoclave stabilized at approximately 65° C. (thereby indicating completion of the initial stage described previously in the specification). The temperature was then increased to 120° C., and maintained for 60 to 90 minutes. A smaller hydrogen uptake was noted being about 5% of the total hydrogen taken up. The autoclave was then cooled, discharged, flushed with nitrogen and discharged with nitrogen pressure. The reaction product was collected and purified, and 2,260 grams of β-(2',5'-dimethoxyphenyl)-α-methyl-ethylamine, representing a 74% total yield, were recovered.

The following example confirms the reaction whereby a ketone is converted to the corresponding amine.

*Example 2*

An autoclave was charged with the following materials:

| | | |
|---|---|---|
| p-Dimethoxyphenyl acetone | kg | 3 |
| Ammonium acetate | kg | 1.2 |
| Acetic acid | ml | 180.0 |
| Methanol | l | 9.5 |
| Water | ml | 300.0 |
| Raney nickel catalyst | g | 500.0 |

The autoclave was closed, heated to 90° C. and hydrogen was then introduced at a pressure of 1,200 pounds per square nich. There was no rise in temperature. No measurable hydrogen was taken up after two hours, although the reaction was permitted to continue overnight. At the end of this time, no noticeable amount of ketone remained. Analysis showed a 95% yield of β-(2',5'-dimethoxyphenyl)-α-methyl-ethylamine, 3% distillation residues and 2% acid insolubles.

What is claimed is:

1. The process of preparing amines from nitroolefins which comprises catalytically reducing a nitroolefin of the formula:

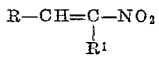

wherein R is selected from the group consisting of phenyl, alkyl-phenyl, alkoxy-phenyl, halo-phenyl and alkyl radicals and R¹ is a lower alkyl radical, with molecular hydrogen in the presence of an aliphatic carboxylic acid to form a reaction mixture comprising the ammonium salt of said acid and the corresponding ketone and the corresponding amine of said nitroolefin, said reducing step being exothermic; and continuing said reducing for a period of at least one hour after the exotherm has substantially subsided and until substantially all of said ketone is converted into said amine.

2. The process of preparing amines from nitroolefins which comprises catalytically reducing a nitroolefin of the formula:

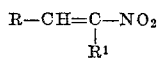

wherein R is selected from the group consisting of phenyl, alkyl-phenyl, alkoxy-phenyl, halo-phenyl and alkyl radicals and R¹ is a lower alkyl radical, with molecular hydrogen in the presence of an aliphatic carboxylic acid to form a reaction mixture comprising the ammonium salt of said acid and the corresponding ketone and the corresponding amine of said nitroolefin, said reducing step being exothermic; and continuing said reducing at a temperature of about 80° C. to at least 120° C. for a period of from about 1 to 16 hours after the exotherm has substantially subsided and until substantially all of said ketone is converted into said amine, said time of continued reducing being greater at said lower named temperatures and shorter at said higher named temperatures.

3. The process of preparing amines from nitroolefins which comprises catalytically reducing a nitroolefin of the formula:

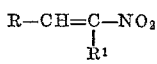

wherein R is selected from the group consisting of phenyl, alkyl-phenyl, alkoxy-phenyl, halo-phenyl and alkyl radicals and R¹ is a lower alkyl radical, with molecular hydrogen in the presence of an aliphatic carboxylic acid at a temperature within the range of about 40° C. to about 100° C., to form a reaction mixture comprising the ammonium salt of said acid and the corresponding ketone and the corresponding amine of said nitroolefin, said reducing step being exothermic; continuing said reducing until the exotherm has substantially subsided; and thereafter elevating the temperature and reacting said reaction mixture with molecular hydrogen until substantially all of said ketone is converted into said amine.

4. The process of preparing amines from nitroolefins which comprises catalytically reducing a nitroolefin of the formula:

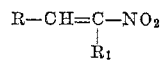

wherein R is selected from the group consisting of phenyl, alkyl-phenyl, alkoxy-phenyl, halo-phenyl and alkyl radicals and R¹ is a lower alkyl radical, with molecular hydrogen in the presence of an aliphatic carboxylic acid at a temperature within the range of about 40° C. to about 100° C., to form a reaction mixture comprising the ammonium salt of said acid and the corresponding ketone and the corresponding amine of said nitroolefin, said reducing step being exothermic; continuing said reducing until the exotherm has substantially subsided; and thereafter elevating the temperature to at least 120° C. and continuing said reducing with molecular hydrogen for about 60 to 90 minutes until substantially all of said ketone is converted into said amine.

5. The process as defined in claim 4 wherein the aliphatic carboxylic acid has an ionization constant at 25° C. of between about $1.4 \times 10^{-5}$ and $1.1 \times 10^{-3}$ and the reduction is effected in the presence of a Raney nickel catalyst.

6. The process which comprises reducing 1-(2',5'-dimethoxyphenyl)-2-nitro-propene with molecular hydrogen in the presence of an aliphatic carboxylic acid and a Raney nickel catalyst to form a reaction mixture of ketone and amine comprising respectively p-dimethoxyphenyl acetone and β-(2',5'-dimethoxyphenyl)-α-methyl-ethylamine and the ammonium salt of said acid, said reducing step being exothermic; and continuing said reducing for a period of at least one hour after the exotherm has substantially subsided until substantially all of said ketone is converted into said amine.

7. The process which comprises reducing 1-(2',5'-dimethoxyphenyl)-2-nitro-propene with molecular hydrogen in the presence of an aliphatic carboxylic acid and a Raney nickel catalyst to form a mixture of ketone and amine comprising respectively p-dimethoxyphenyl acetone and β-(2',5'-dimethoxyphenyl)-α-methyl-ethylamine and the ammonium salt of said acid, said reducing step being highly exothermic; continuing said reducing until the exotherm has substantially subsided; and thereafter elevating the temperature to about 120° C. and continuing said reducing for about 60 to 90 minutes until substantially all of said ketone is converted into said amine.

8. The process as defined in claim 7 wherein said aliphatic carboxylic acid is acetic acid.

References Cited in the file of this patent
UNITED STATES PATENTS

| 2,636,901 | Tindall | Apr. 28, 1953 |
| 2,647,930 | Tindall | Aug. 4, 1953 |
| 3,062,884 | Green | Nov. 6, 1962 |

OTHER REFERENCES

Migrdichian: "Organic Synthesis," vol. 1, page 472 (1957), QD 266 M55.